United States Patent [19]

Patsiokas et al.

[11] Patent Number: 5,373,547
[45] Date of Patent: Dec. 13, 1994

[54] METHOD AND APPARATUS FOR RADIO HANDSET SPECTRUM RANGE REGISTRATION

[75] Inventors: Stelios J. Patsiokas, Plantation; Kenneth D. Alton, Coral Springs, both of Fla.

[73] Assignee: Motorola, Inc., Schaumburg, Ill.

[21] Appl. No.: 84,656

[22] Filed: Jun. 28, 1993

[51] Int. Cl.$^5$ .................... H04M 11/00; H04Q 7/00
[52] U.S. Cl. ................................ 379/61; 379/59; 455/33.4
[58] Field of Search ................... 379/61, 63, 59; 455/34.1, 54.2, 54.1, 33.1, 33.4, 34.2, 56.1, 62

[56] References Cited

U.S. PATENT DOCUMENTS

| | | | |
|---|---|---|---|
| 5,218,630 | 6/1993 | Patsiokas et al. | 379/59 |
| 5,280,541 | 1/1994 | Marko et al. | 379/61 |

*Primary Examiner*—Curtis Kuntz
*Assistant Examiner*—Michael B. Chernoff
*Attorney, Agent, or Firm*—Pablo Meles; John H. Moore

[57] ABSTRACT

A method for handset spectrum registration in cordless telephone systems having base stations operating in a first spectrum (102) and a second spectrum (101) where the first and second spectrums have a portion (103) of overlapping spectrum ranges comprises the steps at a handset (206) of scanning (18) the portion of overlapping spectrum ranges provided by a base station which is either a first base station having the first spectrum range or a second base station having the second spectrum and then choosing (20) a channel within the overlapping spectrum ranges substantially free from interference and designating the channel as the initial link establishment channel and as a re-establishment channel for subsequent re-establishment links. The handset then sends (22) a re-establishment link request to the base station to have the base re-establish a link with the re-establishment channel on the handset. Then, the handset determines (24) if the re-establishment channel was for a base station operating in the first spectrum range or a base station operating in the second spectrum range by measuring the amount of time it takes to achieve the re-establishment.

18 Claims, 4 Drawing Sheets

METHOD AND APPARATUS FOR RADIO HANDSET SPECTRUM RANGE REGISTRATION

TECHNICAL FIELD

This invention relates generally to a method and apparatus for handset spectrum registration in cordless telephone systems and in particular, to a method and apparatus for spectrum registration in disparate cordless telephone systems having overlapping frequencies.

BACKGROUND

Second generation cordless phones (CT-2) are currently under adoption by many countries granting disparate spectrum allocations. Working under CT-2 Common Air Interface Specification, Version I-ETS 300 131 R1 (CAI), CT-2 provides digital cordless telephony at home, office, and other areas suitable for CT-2 such as airports and sports stadiums. Generally, the frequency of operation for CT-2 in European countries is consistent using 4 Megahertz of bandwidth accommodating 40 channels with each channel occupying 100 Kilohertz. Unfortunately, other countries allocate spectrum for CT-2 and other services such as two-way trunked radio services in inconsistent frequency spectrums. Since cordless phone spectrum allocation is not internationally regulated, or at least regulated to the extent that cellular frequencies are allocated, the prospect for a uniform allocation between countries or between provinces or smaller governmental sovereign entities appears limited. For example, the standard spectrum designated for CT-2 in the United Kingdom, Singapore and Hong Kong ranges from 864.1 Megahertz to 868.1 Megahertz (MHz) as in most of Europe, whereas the range in other countries varies and is quite inconsistent. For instance, in Australia the allocated CT-2 spectrum ranges from 861.1 MHz to 865.1 MHz. The allocated CT-2 spectrum ranges from 863.5 MHz to 869.0 MHz in Argentina. In one or more provinces of the Peoples Republic of China (PRC), the allocated CT-2 spectrum ranges from 864.1 MHz to 868.1 MHz as in the United Kingdom, while other provinces in the PRC have spectrum ranging from 866 MHz to 870 MHz. Thus, a handset theoretically having the capability to function in all these spectrum ranges may not necessarily operate or be legally allowed to operate in each and every country or at least roam between countries or (in the case of the PRC) between provinces because the handset may not be able to determine an appropriate frequency for establishing a link.

Different spectrum allocation for the same service makes roaming between countries or provinces very difficult since the handset is typically programmed to operate on only one system's frequency. Typically, the handset can only register with a particular operator having a particular given link identification (LID). Unfortunately, since the allocation of spectrum is not uniformly allocated, a particular spectrum range cannot necessarily be associated with a particular LID. Roaming between Hong Kong and Australia, for example, is extremely difficult since there is only 1 MHz of overlapping spectrum between the two countries. Under the restraints of the CAI operation, the handset would acquire service on a correct channel only 25% of the time. Likewise, roaming between the different provinces in the People's Republic of China would be extremely difficult since in certain circumstances there may only be 2 MHz of overlapping spectrum between provinces. Additionally, there may be other services such as trunked radio service which may share a portion of the same spectrum. Thus, there exists a need for a handset that can operate and acquire the appropriate spectrum and channels in establishing a link in systems that have disparate, but overlapping frequency allocation and further be able to operate within the CT-2 CAI standard.

SUMMARY OF THE INVENTION

A method for handset spectrum registration in cordless telephone systems having base stations operating in a first spectrum and a second spectrum where the first and second spectrums have a portion of overlapping spectrum ranges comprises the steps at a handset of scanning the portion of overlapping spectrum ranges provided by a base station which is either a first base station having the first spectrum range or a second base station having the second spectrum and then choosing a channel within the overlapping spectrum ranges substantially free from interference and designating the channel as the initial link establishment channel and as a re-establishment channel for subsequent re-establishment links. The handset then sends a re-establishment link request to the base station to have the base re-establish a link with the re-establishment channel on the handset. Then the handset determines if the re-establishment channel was for a base station operating in the first spectrum range or a base station operating in the second spectrum range by measuring the amount of time it takes to achieve the re-establishment.

DETAILED DESCRIPTION OF THE PREFERRED EMBODIMENT

Figure 1:
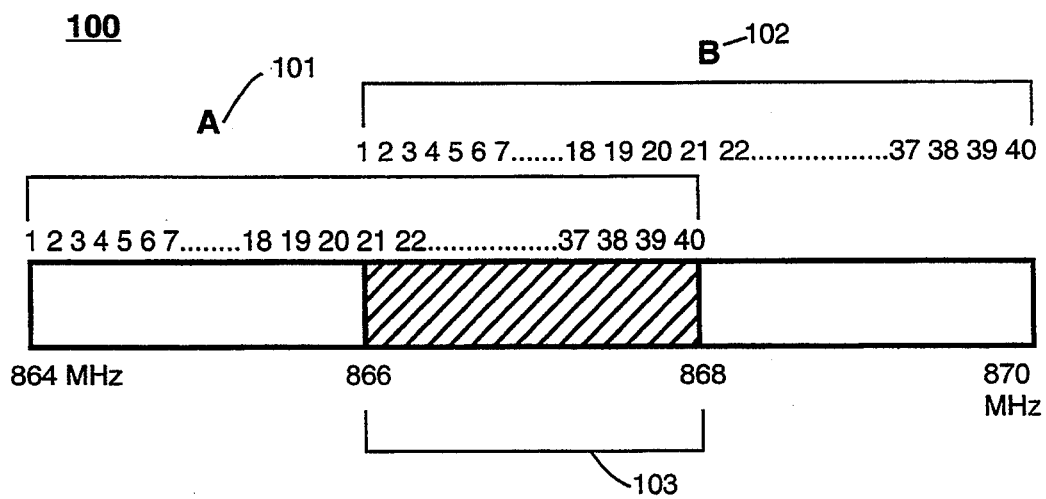
FIG. 1 is an depiction of different CT-2 spectrum allocation between systems in accordance with the present invention.
Figure 2:
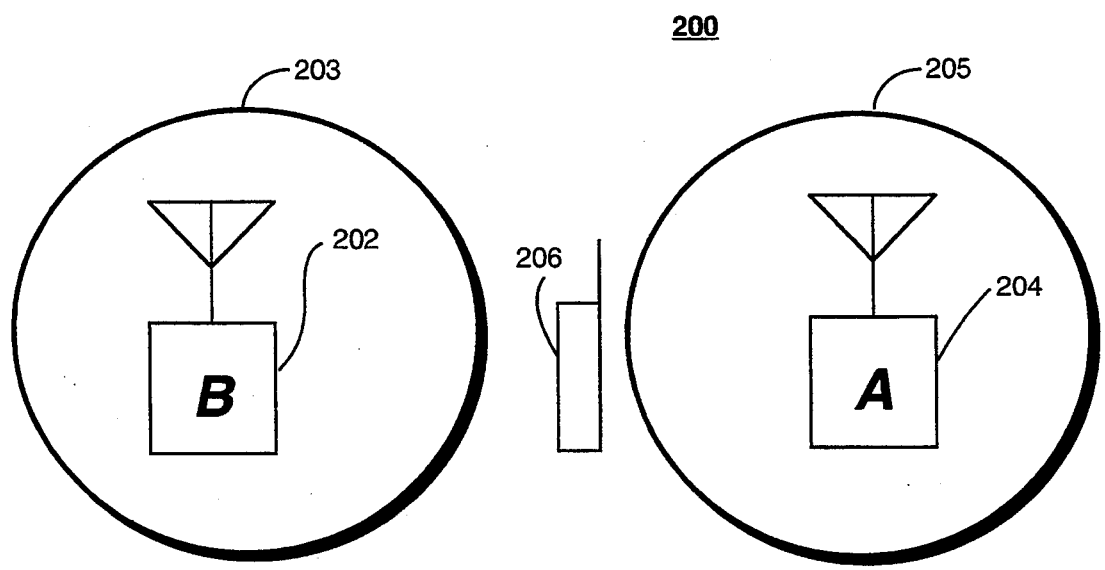
FIG. 2 is a system diagram of a cordless telephone handset and a plurality of base stations in accordance with the present invention.

Referring to FIGS. 1 and 2, there is shown a communication system 200 having plurality of base stations 202 and 204 (having cell sizes 203 and 205 respectively) operating in different spectrum ranges (100) and a cordless telephone handset (CT-2 handset) 206 operable in both spectrum ranges of the base stations. As an example referring to FIG. 1, base station 202 operates in the spectrum range between 866 MHz and 870 MHz while base station 204 operates in the spectrum range between 864 MHz and 868 MHz. Therefore, base stations 202 and 204 share the spectrum range (103) between 866 MHz and 868 MHz. If the handset 206 were operating in a spectrum range for the base station 202 and the spectrum range did not overlap, then the handset 206 could not roam and perform a seamless change into the spectrum range of the base station 204. (If the cells sizes 203 and 205 overlapped (not as shown in FIG. 2) and the spectrum ranges 101 and 102 overlapped, the handset 206 can potentially perform a seamless change between the base stations 202 and 204 without any gap in the link.) Even as shown, where the cell sizes 203 and 205 do not overlap and a gap in service occurs, the present system would preferably allow a user of a cordless handset in accordance with the present invention to automatically register in either system. This registration process with different systems having disparate spectrum allocation would preferably be transparent to the user. Thus, the overlapping spectrum range (103) provides a means for allowing the handset to determine the operating spectrum of base stations using disparate spectrum ranges.

Figure 3:
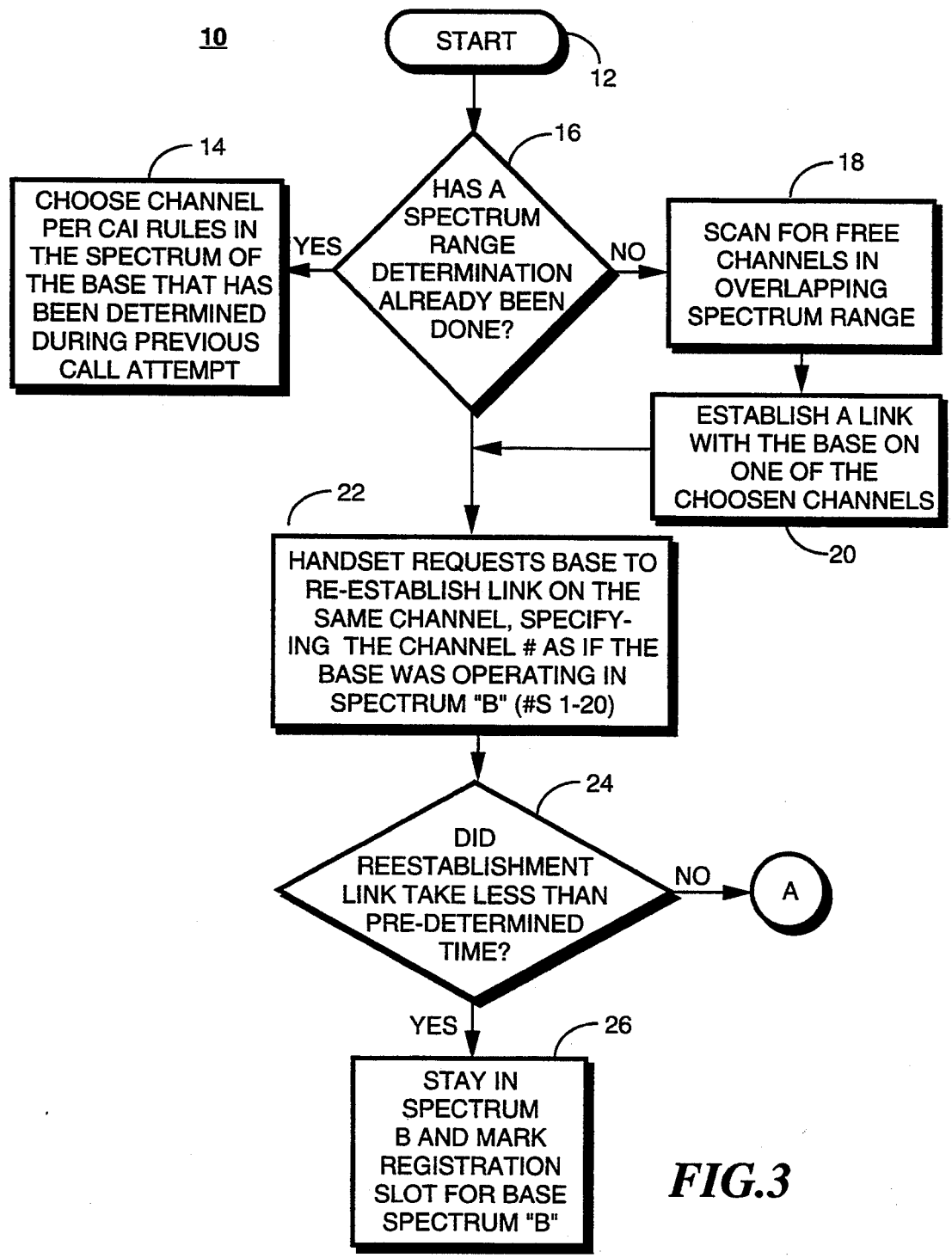
FIG. 3 is a flow chart for a method for a cordless telephone handset spectrum registration in accordance with the present invention.
Figure 4:
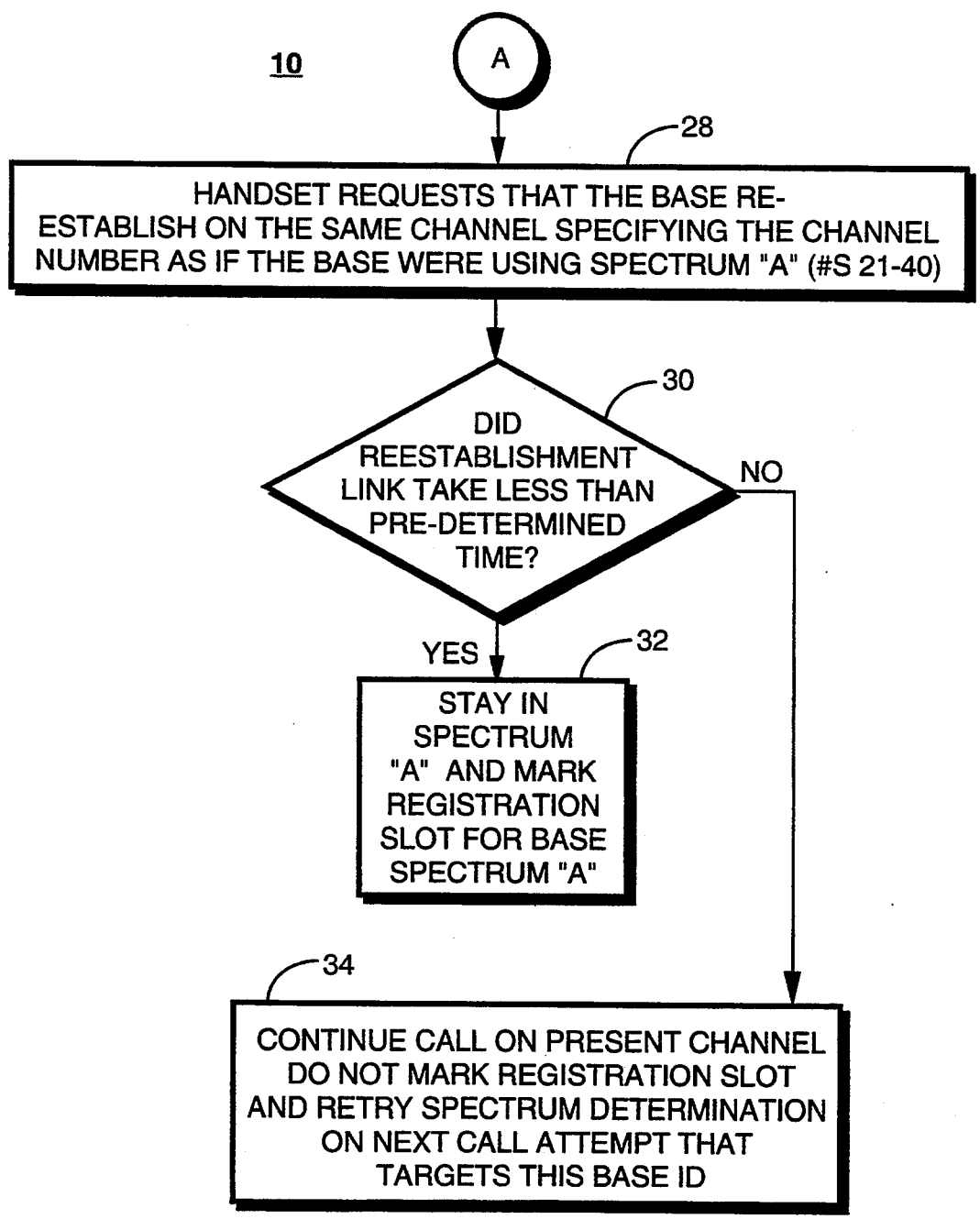
FIG. 4 is a continuation of the flow chart of FIG. 3 in accordance with the present invention.

Referring to FIG. 3 and 4, a flow chart discloses a method 10 for cordless telephone handset spectrum registration in accordance with the present invention. The method begins at step 12 at the handset which then does an inquiry at step 16 to determine if a spectrum range determination has already been done. If the determination was previously made, the handset at step 14 chooses a channel per the CAI rules in the spectrum of the base that was previously determined in a previous call attempt. If a spectrum range determination has not been made at step 16, then the handset scans for at least one channel substantially free from interference in the overlapping spectrum range in step 18 and preferably designates at least one channel as the initial establishing link channel and either the same channel or possibly another channel as the channel for later reestablishments. Optionally, the other channel or the second channel may be designated as an alternate link establishment channel. The overlapping spectrum ranges to be scanned are preferably predetermined and preset in the handset. Next, in step 20, the handset links with the base station (which has a spectrum range unknown to the handset as of yet) on the initial establishing link channel. In step 22, the handset sends a re-establishment link request to the base station in accordance with the CT-2 CAI protocol so that the base station can establish a link on the same channel, designating the specific channel number and assuming that the base is operating in spectrum "B" (the default spectrum range in this case), thus the channel numbers will be 1–20. As seen in FIG. 1, the handset either operates in a first spectrum range of 4 MHz having 40 channels (each channel occupying 100 Kilohertz) or a second spectrum range of 4 MHz having 40 channels, wherein the spectrum ranges share 20 channels. The channels shared by the two spectrum ranges are either designated by the handset as channels 1 through 20 in the "B" spectrum (102) or channels 21 through 40 in the "A" spectrum (101). For purposes of this example and for simplicity, the "B" spectrum is designated as the default spectrum. It is contemplated within the present invention that the system 200 can operate in other spectrum ranges conforming to the CT-2 CAI protocol and that the 864 MHz to 870 MHz discussed herein is merely illustrative.

At step 24, the handset determines whether the base it is presently linked with was operating in the assumed spectrum range ("B") or in another spectrum range such as the second spectrum range ("A") by measuring the amount of time the handset takes to achieve a link re-establishment. Due to the constraints of the CT-2 system and the common air interface, if the link is achieved within a predetermined time (such as 2 seconds as defined in the CT-2 CAI protocol), then the handset can determine that the base is operating in the default spectrum "B′ (102). Thus, in step 26 the handset remains in spectrum "B" records the spectrum determined or otherwise marks a registration slot in the handset with the spectrum "B" so that subsequent link attempts are only in the appropriate spectrum for the targeted base. In other words, the handset "remembers" which spectrum range the base station is operating in and any subsequent link attempts to the same base (as can be determined by the Link Identification number (LID) of the particular base station) will be done conventionally in the base's spectrum per the standard CT-2 CAI protocols. Thus, once the spectrum range is determined by the handset, the handset is free to re-establish a link on any of the 40 available (preferably free from interference) channels for the determined spectrum range. This is equally applicable at step 32 in FIG. 4, and at steps 66 and 72 in FIG. 5 as will become apparent below. Also at step 26, the call is continued on the present channel.

If at step 24, the handset cannot reestablish a link within the predetermined time, then the handset requests at step 28 that the base station again reestablish a link on the same channel, assuming this time that the base station is operating in spectrum "A". Then The specified channel will be in the channel number range between 21 and 40. Again, at step 30 the handset determines whether the re-establishment channel was within the time limit indicating that the base is operational in spectrum range "A" by measuring the amount of time the handset takes to achieve a link with the re-establishment channel. If the link establishment takes less than 2 seconds at this point, then the handset knows to stay in spectrum "A" at step 32. Once again, the registration slot in the handset is marked or designated, but this time for the base having spectrum "A". Again, as in step 26, the call is continued on the present channel in step 32. If at step 30, the link is not reestablished within the predetermined time, the call will continue on the present channel (in the 2 MHz overlapping spectrum) and no spectrum determination is possible.

Figure 5:
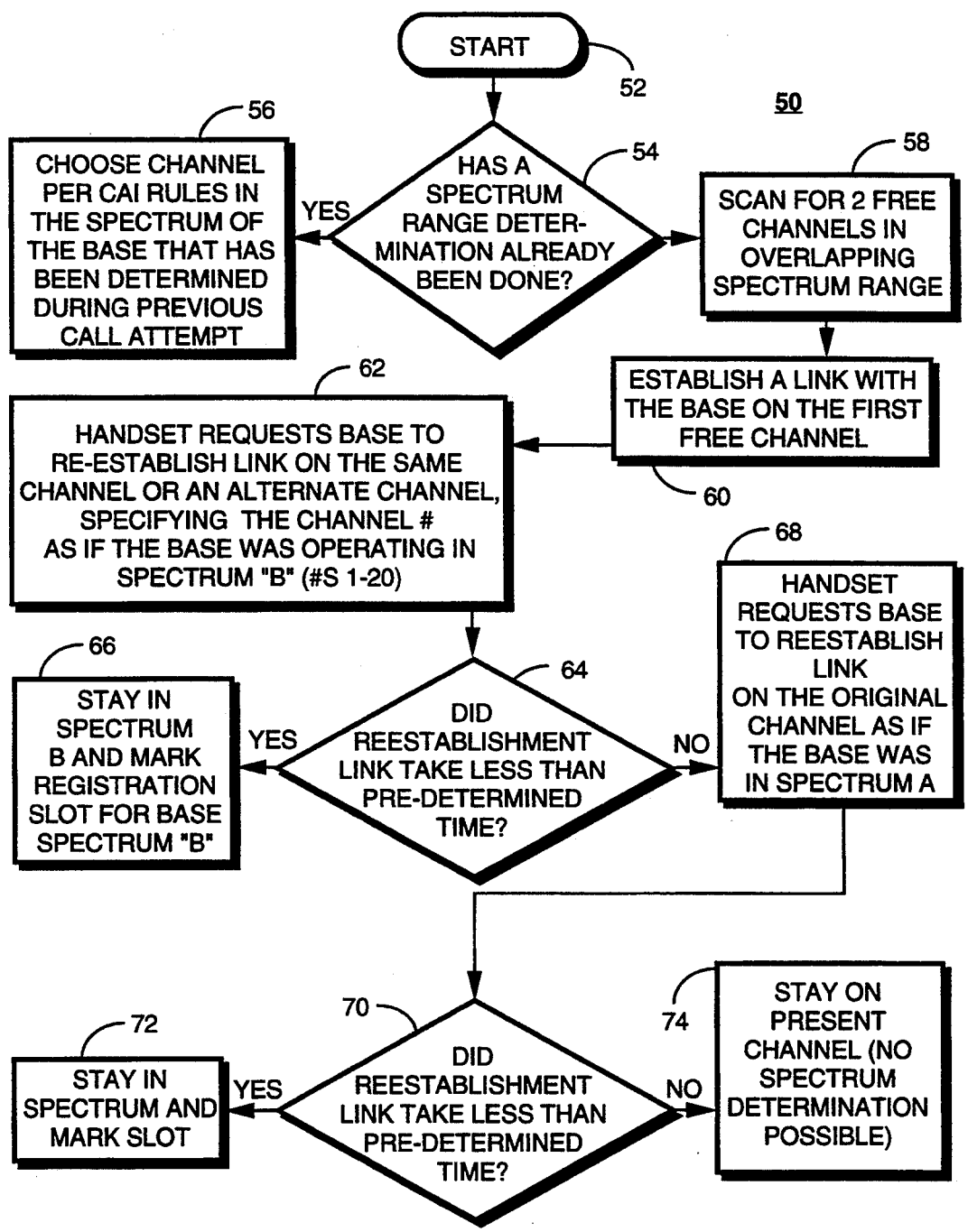
FIG. 5 is a flow chart of an alternative method for cordless telephone handset spectrum registration in accordance with the present invention.

Referring to FIG. 5, a flow chart discloses a method 50 for cordless telephone handset spectrum, registration in accordance with the present invention wherein 2 channels are used rather than one channel as disclosed in method 10. The method begins at step 52 at the handset which then does an inquiry at step 54 to determine if a spectrum range determination has already been done. If the determination was previously made, the handset at step 56 chooses a channel per the CAI rules in the spectrum of the base that was previously determined in a previous call attempt. If a spectrum range determination has not been made at step 54, then the handset scans and designates 2 channels substantially free from interference within the overlapping spectrum range, wherein the first channel is used for the initial link establishment with the base station (which has a spectrum range unknown to the handset as of yet) and wherein the second channel is designated as a re-establishment channel for subsequent reestablishments. At step 60, the handset establishes a link with the base on the first channel. Then, in step 62, the handset sends a re-establishment link request to the base station so that the base station establishes a link on the same channel or an alternate channel, specifying a channel number 1–20 assuming that the base was operating in the default spectrum "B". Again, for purposes of this example and for simplicity, the "B" spectrum is designated as the default spectrum.

At step 64, the handset determines whether the re-establishment channel was the first base station operating in the first spectrum range ("B") by measuring the amount of time the handset takes to achieve a link re-establishment. Due to the constraints of the CT-2 system and the common air interface, if the link is achieved within a predetermined time (such as 2 seconds), then the handset can determine that it is operating in the default spectrum "B' (102). Thus, if the link is achieved within 2 seconds at this point, then in step 66 the handset remains in spectrum "B" and marks the registration slot as "B" and continues the call on the present channel.

At step 64, if the handset takes longer than the predetermined time to achieve re-establishment, then the handset goes on to step 68. At step 68, the handset requests that the base station reestablish link back on the first channel specifying the channel as if the base were operating within spectrum "A". At step 70, the handset once again determines whether the base station is operating in the second spectrum range ("A") by measuring the amount of time the handset takes to achieve a link with the re-establishment channel. If the link is achieved within a predetermined time (such as 2 seconds), then the handset can determine that it is operating in the spectrum "A' (101) Thus, in step 72 the handset remains in spectrum "A" and marks the registration for the base as spectrum "A" and the call continues on the present channel. If at step 70, the link is not reestablished within the predetermined time, then call will continue to step 74 on the present channel (in the 2 MHz overlapping spectrum) and no spectrum determination is possible. Thus, the registration slot is not marked and the handset can subsequently determine the spectrum range on another call attempt.

A cordless telephone system having base stations operating in a first spectrum and a second spectrum where the first and second spectrums have a portion of overlapping spectrum ranges preferably comprises a radiotelephone handset or cordless phone having a means for scanning the portion of overlapping spectrum ranges, a means for choosing at least one channel within the overlapping spectrum range substantially free from interference, a means for sending a re-establishment link request to a base station, and a means for determining if the re-establishment channel was for the first base station operating in the first spectrum range or the second base station operating in the second spectrum range by measuring the amount of time to achieve a link with the re-establishment channel. The means for scanning, the means for choosing, the means for sending, and the means for determining can preferably be arranged in most conventional digital radiotelephones in the form of a processing means such as microprocessor along with memory and a software routine substantially in conformance with the flowcharts of FIGS. 3 and 4 or of the flowchart of FIG. 5. Likewise, a base station having the means for establishing a link with the handset and means for re-establishing a link with the handset would also likely encompass a microprocessor with memory having software for achieving such links within a CT-2 CAI protocol in a given spectrum range.

What is claimed is:

1. A method for handset spectrum range registration in cordless telephone systems having base stations operating in a first spectrum range and a second spectrum range where the first and second spectrum ranges have a portion of overlapping spectrum ranges, comprising the steps of:
   at the handset:
      scanning the portion of overlapping spectrum ranges provided by the base stations;
      choosing a channel within the overlapping spectrum ranges substantially free from interference and designating the channel as an initial link establishment channel and as a re-establishment channel for subsequent re-establishments, wherein an initial link is established with the channel;
      sending a re-establishment link request to the base station to have the base station re-establish a link with the re-establishment channel on the handset;
      determining if the re-establishment channel was for the first base station operating in the first spectrum range or the second base station operating in the second spectrum range by measuring the amount of time to achieve the re-establishment;
   at the base station in communication with the handset:
      establishing a link with the handset on the initial link establishment channel;
      re-establishing a link with the handset on the re-establishment channel designated by the handset.

2. The method of claim 1, wherein the step of determining further comprises the step of determining that the base station is operating in the second spectrum range if the amount of time measured to achieve a link with the re-establishment channel was less than a predetermined time.

3. The method of claim 2, wherein the predetermined time is 2 seconds.

4. The method of claim 2, wherein the method further comprises the step at the handset of remaining in the second spectrum range and marking a registration slot in the handset for second base operating in the second spectrum.

5. The method of claim 1, wherein the step of determining comprises the further step of requesting that the base reestablish on the designated channel specifying a channel number as if the base were for the first base if the amount of time measured to achieve a link with the re-establishment channel was more than a predetermined time.

6. The method of claim 5, wherein the method further comprises the step at the handset of remaining in the first spectrum range and marking a registration slot in the handset for first base operating in the first spectrum.

7. The method of claim 1, wherein the step of choosing a channel comprises choosing a free channel within the constraints of the Common Air Interface Specification, Version I-ETS 300 131 R1 for CT-2 telephones.

8. The method of claim 1, wherein if the amount of time measured to achieve a link with the re-establishment channel was more than a predetermined time and the handset cannot determine whether the base station is operating in the first spectrum range or the second spectrum range, then the initial link is continued on a present channel within the overlapping spectrum range and a registration slot is not marked in the handset.

9. A method for handset spectrum range registration in cordless telephone systems having base stations operating in a first spectrum range and a second spectrum range where the first and second spectrums have a portion of overlapping spectrum ranges, comprising the steps of:
  at the handset:
    scanning the portion of overlapping spectrum ranges provided by the base stations;
    choosing a pair of channels within the overlapping spectrum ranges substantially free from interference, wherein an initial link is established with the first channel and the second channel is designated as a re-establishment channel;
    sending a re-establishment link request to the base station to have the base re-establish a link with the designated re-establishment channel on the handset;
    determining if the re-establishment channel was for the first base station operating in the first spectrum range or the second base station operating in the second spectrum range by measuring the amount of time to achieve a link with the re-establishment channel;
  at the base station in communication with the handset:
    establishing a link with the handset on the first channel;
    re-establishing a link with the handset on the second channel designated by the handset.

10. The method of claim 9, wherein the step of determining further comprises the steps of establishing a link with the base station and determining that the second base station is operating in the second spectrum range if the amount of time measured to achieve a link with the re-establishment channel was less than a predetermined time.

11. The method of claim 10, wherein the predetermined time is 2 seconds.

12. The method of claim 11, wherein the method further comprises the step at the handset of remaining in the second spectrum range and marking a registration slot in the handset for the second base operating in the second spectrum.

13. The method of claim 9, wherein the step of determining comprises the further step of requesting that the base reestablish on the designated channel specifying a channel number as if the base was in the first base if the amount of time measured to achieve a link with the re-establishment channel was more than a predetermined time.

14. The method of claim 13, wherein the method further comprises the step at the handset of remaining on the first spectrum range and marking a registration slot in the handset for the first base operating in the first spectrum.

15. The method of claim 9, wherein if the amount of time measured to achieve a link with the re-establishment channel was more than a predetermined time and the handset cannot determine whether the base station is operating in the first spectrum range or the second spectrum range, then the initial link is continued on a present channel within the overlapping spectrum range and a registration slot is not marked in the handset.

16. A cordless telephone for use in communication systems having base stations with different spectrum ranges, wherein the base stations operate in either a first spectrum range or a second spectrum range wherein the first and second spectrums have a portion of overlapping spectrum ranges and wherein the cordless telephone comprises:
  a means for scanning the portion of overlapping spectrum ranges provided by the base stations;
  a means for choosing a channel within the overlapping spectrum ranges substantially free from interference and designating the channel as the initial link establishment channel and as a re-establishment channel for subsequent re-establishment links, wherein an initial link is established with the channel;
  a means for sending a re-establishment link request to the base station to have the base station re-establish a link with the re-establishment channel on the cordless phone;
  means for determining if the re-establishment channel was for a base station operating in the first spectrum range or a base station operating in the second spectrum range by measuring the amount of time to achieve the re-establishment.

17. A cordless telephone system having base stations operating in a first spectrum range and a second spectrum range wherein the first and second spectrum ranges have a portion of overlapping spectrum ranges, comprising:
  a radiotelephone handset, said handset comprising:
    means for scanning the portion of overlapping spectrum ranges provided by a base which is either a first base station having the first spectrum range or a second base station having the second spectrum range;
    means for choosing a pair of channels within the overlapping spectrum ranges substantially free from interference, wherein an initial link is established with the first channel and the second channel is designated as a re-establishment channel;
    means for sending a re-establishment link request to the base station to have the base station re-establish a link with the designated channel on the handset;
    means for determining if the re-establishment channel was for the first base station operating in the first spectrum range or the second base station operating in the second spectrum range by measuring the amount of time to achieve a link with the re-establishment channel;
  at least two base stations, each of said base stations comprising:
    means for establishing a link with the handset on the first channel;
    means for re-establishing a link with the handset on the second channel designated by the handset.

18. A method for handset spectrum registration in cordless telephone systems having base stations operating in a first spectrum range and a second spectrum range where the first and second spectrum ranges have a portion of overlapping spectrum ranges, comprising the steps at the handset of:
  choosing a channel and establishing a link with the channel within the overlapping spectrum ranges;
  designating a channel as a re-establishment channel for subsequent re-establishments;
  sending a re-establishment link request to the base station to have the base station re-establish a link with the re-establishment channel on the handset; and
  determining if the re-establishment channel was for the first base station operating in the first spectrum range or the second base station operating in the second spectrum range by measuring the amount of time to achieve the re-establishment.

* * * * *